(12) United States Patent
Stadtlander et al.

(10) Patent No.: US 8,592,024 B2
(45) Date of Patent: Nov. 26, 2013

(54) REPAIR OF PERFORATED ACOUSTIC SKINS BY REVERSE PIN TRANSFER MOLDING

(75) Inventors: Daniel M. Stadtlander, West Hartford, CT (US); William Bogue, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 2006 days.

(21) Appl. No.: 11/441,893

(22) Filed: May 26, 2006

(65) Prior Publication Data

US 2007/0275212 A1 Nov. 29, 2007

(51) Int. Cl.
*B32B 3/12* (2006.01)
(52) U.S. Cl.
USPC .............. 428/116; 428/117; 428/118; 156/94
(58) Field of Classification Search
USPC .............. 156/94, 285, 286; 428/116–118, 137
See application file for complete search history.

(56) References Cited

U.S. PATENT DOCUMENTS

| | | | |
|---|---|---|---|
| 3,704,194 A | 11/1972 | Harrier | |
| 3,787,546 A | 1/1974 | Pratt | |
| 4,257,998 A | 3/1981 | Diepenbrock | |
| 5,246,520 A * | 9/1993 | Scanlon et al. | 156/245 |
| 5,252,279 A | 10/1993 | Gore | |
| 5,653,836 A | 8/1997 | Mnich et al. | |
| 5,807,628 A | 9/1998 | Mnich | |
| 5,866,272 A * | 2/1999 | Westre et al. | 428/593 |
| 5,882,756 A | 3/1999 | Alston et al. | |
| 6,355,203 B1 * | 3/2002 | Charmes et al. | 264/493 |
| 6,451,241 B1 * | 9/2002 | Ohliger et al. | 264/510 |
| 2004/0126537 A1 * | 7/2004 | Jackson et al. | 428/118 |
| 2004/0207106 A1 | 10/2004 | Reis et al. | |
| 2006/0059828 A1 | 3/2006 | Stevenson et al. | |

FOREIGN PATENT DOCUMENTS

EP 0839635 5/1998

OTHER PUBLICATIONS

Sam Dastin, "Repairing Advanced Composite Materials," Article, Feb. 1986, pp. 86-90, vol. 58, No. 4, Machine Design, Penton Media, Cleveland, Ohio.
European Search Report Dated Sep. 26, 2007.

* cited by examiner

*Primary Examiner* — Christopher Schatz
(74) *Attorney, Agent, or Firm* — Carlson, Gaskey & Olds

(57) ABSTRACT

A method of restoring a section of a composite includes the steps of removing an undesirable section of a perforated composite and depositing a repair material in the location of the removed, undesirable section. The repair material is then cured. Before completing the curing step, one or more opening are formed through the repair material to produce one or more perforations through the repair material upon completing the curing step.

14 Claims, 3 Drawing Sheets

__US 8,592,024 B2__

REPAIR OF PERFORATED ACOUSTIC SKINS BY REVERSE PIN TRANSFER MOLDING

BACKGROUND OF THE INVENTION

This invention relates to composite materials and, more particularly, to repairing composite sandwich structures.

Composite structures are commonly known and used in, for example, gas turbine engines for aerodynamic fairings. One type of composite is a sandwich structure having a face skin and a back skin that are bonded to a honeycomb core. The face skin and back skin may be laminated structures with a resin matrix, such as epoxy, with one or more plies of reinforcement fibers.

Holes through the face skin are typically mechanically machined or laser drilled or formed in a process known as pin forming. In the pin forming method, a series of pins are pushed through resin impregnated woven fiber plies and left in place during curing. The pins are then removed after curing, leaving a hole through the outer skin. Skins made with the pin forming method are generally structurally superior because the reinforcement fibers remain intact and continuous, whereas the mechanical machining process and laser drilling severs the fibers, thereby diminishing the reinforcing properties of the fibers.

In some instances, it is desirable to repair a section of the face skin that has become damaged from an impact, elevated temperatures, abrasion, erosion, or other phenomenon rather than replace the entire face skin. A typical repair of a pin-formed face skin includes removing the section of the perforated face skin and repairing it with a solid laminate patch. Sometimes the patch is left solid, which leads to loss in acoustic absorption. Other times, new perforations are mechanically machined into the patch. Disadvantageously, the patch is made thicker to make up for the loss in strength caused by the mechanical machining. A thicker patch can also cause a loss in acoustic absorption by increasing the thickness to diameter ratio for the skin. Thus, there is a need for a repair method that allows replacement of a damaged section of the perforated skin while maintaining structural, acoustic, and dimensional properties. This invention addresses those needs while avoiding the shortcomings and drawbacks of the prior art.

SUMMARY OF THE INVENTION

An example method of restoring a section of a composite includes steps of removing an undesirable section of a perforated skin, and depositing repair a material in the location of the removed undesirable section. The repair material is then cured. Before completing the curing process, one or more opening are formed through the repair material to produce one or more perforations through the repair material.

An example perforated composite component includes a honeycomb, a perforated skin bonded to the honeycomb, and a repair section attached to the perforated skin. The repair section includes one or more perforations and one or more continuous reinforcement fibers that have been displaced to accommodate the perforation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
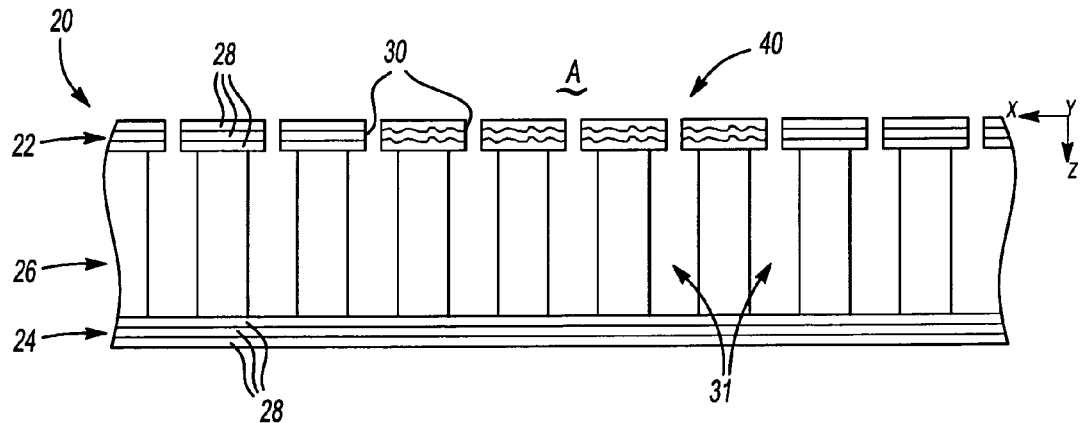
FIG. 1 illustrates an example perforated composite having an undesirable section.

FIG. 1 illustrates selected portions of an example perforated composite 20, such as an acoustic composite used in a fan-bypass area or nacelle of a gas turbine engine for noise attenuation. In this example, the perforated composite sandwich structure 20 includes a perforated skin 22 and a solid back skin 24 that are bonded to a machined face of a honeycomb core 26. In the disclosed example, each of the perforated skin 22 and back skin 24 include composite layers 28, such as a composite made of a resin matrix with continuous woven fiber reinforcement. The perforated skin 22 includes perforations 30 that extend through the thickness of the perforated skin 22 from an airflow side, A, to the honeycomb core 26. The perforations 30 of the perforated composite sandwich structure 20 in conjunction with cell chambers 31 of the honeycomb core 26 operate in a known manner to attenuate noise.

In the disclosed example, the perforated composite sandwich structure 20 includes an undesirable section 40 that has, for example, become damaged from an impact, elevated temperatures, abrasion, erosion, or other phenomenon. As will be described below, the undesirable section 40 is removed and replaced with a repair material 51 (FIG. 5) such that the perforated composite sandwich structure 20 maintains its structural, acoustic, and dimensional properties. In the disclosed example, the repair material 51 is made of a similar or identical composite layer as the perforated skin 22 (i.e., having a resin matrix with continuous woven fiber reinforcement).

Figure 2:
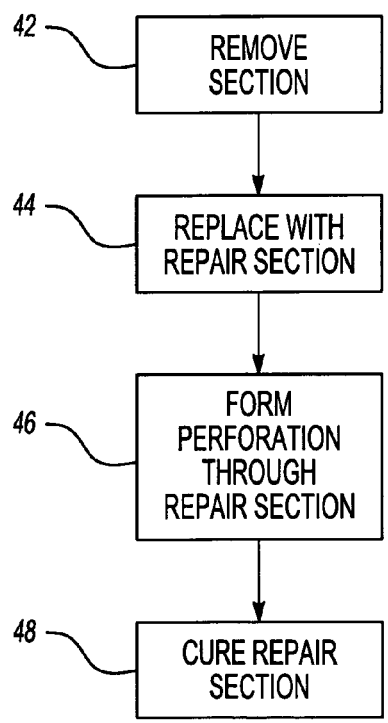
FIG. 2 illustrates an example method for repairing the perforated composite shown in FIG. 1.

Referring to the example shown in FIG. 2, the perforated composite sandwich structure 20 is repaired in several steps. The undesirable section 40 is removed from the perforated composite 20 at step 42. The undesirable section 40 is replaced with a repair section 51 at step 44, and perforations are formed through the central area of the repair material 51 at step 46. At step 48, the repair material 51 is cured to form a repaired perforated composite 20 that has similar structural, acoustic, and dimensional properties as the original perforated composite 20 (e.g., before the repair and damage to the undesirable section 40).

Figure 3:
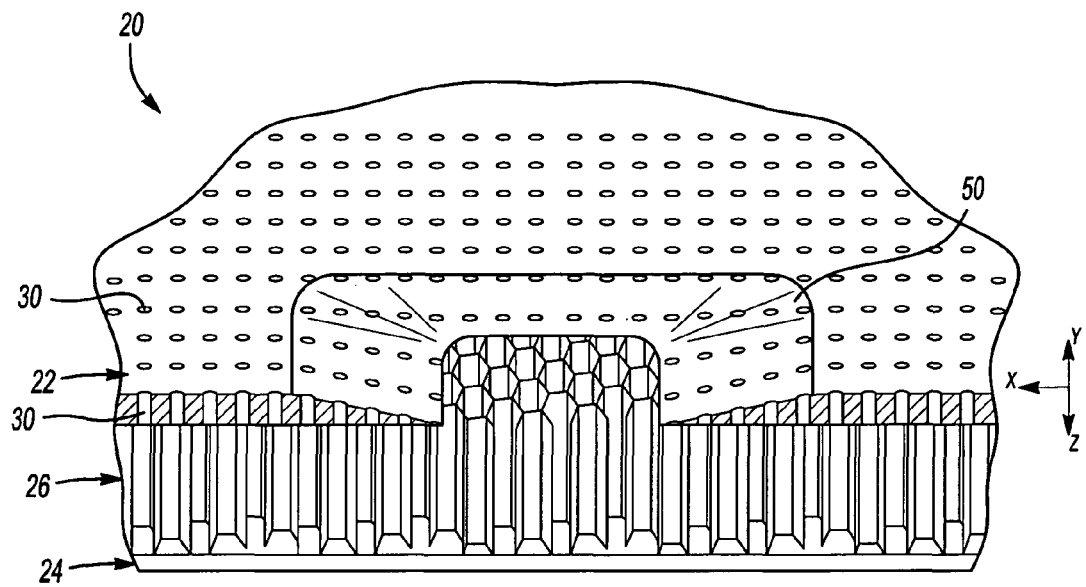
FIG. 3 illustrates a perspective view of the perforated composite after a removal step of the repair process.
Figure 4:
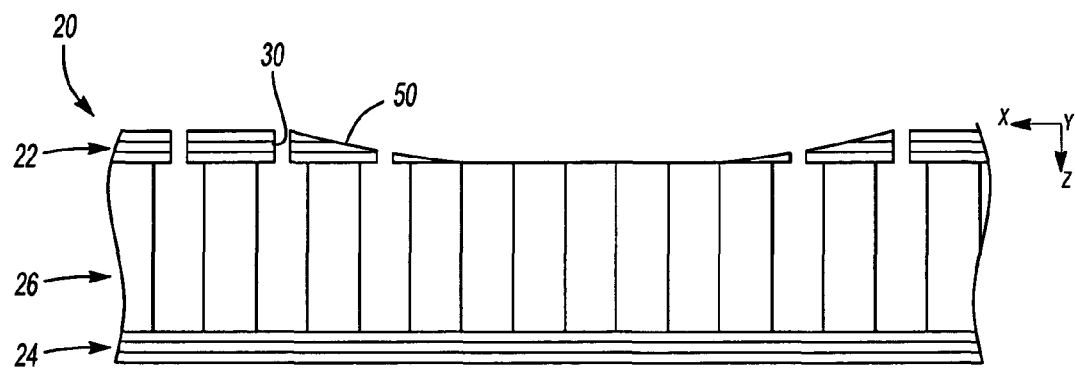
FIG. 4 illustrates a cross-sectional view of the perforated composite after the removal step of the repair process.

FIGS. 3 and 4 show a perspective view and a cross-sectional view, respectively, of the perforated composite 20 after the removal step 42. The undesirable section 40 can be removed in a variety of different ways. In one example, the undesirable section 40 is mechanically removed using a grinding, sanding, or other known mechanical process. In this example, the undesirable section 40 is removed such that the remaining perforated skin 22 has a tapered surface 50 that gradually slopes from the outer surface of the perforated skin 22 toward the honeycomb core 26.

Figure 5:
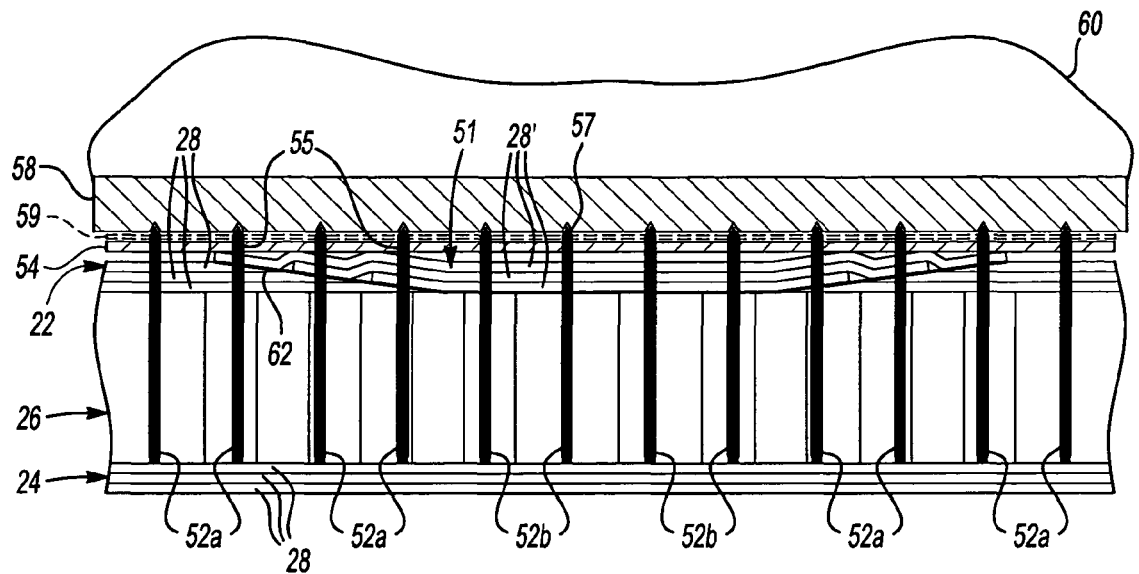
FIG. 5 illustrates an example of the perforated composite during the repair process.

As shown in FIG. 5, first pins 52a are then inserted through the remaining portions of the perforations 30 in the tapered surface 50. The repair material 51 is placed into the location of the removed undesirable section 40. The tapered surface 50 at least partially supports the repair material 51 and provides overlap between the composite layers 28 of the remaining perforated skin 22 and layers 28' of the repair material 51. The overlap ultimately attaches the repair material 40 to the perforated composite sandwich structure 20. The repair material 51 is worked over the pins 52a and seated over the honeycomb 26. A template 54 is then placed over the repair material 51 using the first pins 52a to locate the template. In this example, the template 54 includes a pattern of openings 55 that corresponds to the pattern of the perforations 30 through the perforated skin 22 (e.g., as seen in FIG. 3). The template 54 is used to determine locations to insert second pins 52b where the perforated skin 22 has been entirely removed and no perforations 30 remain (i.e. at the center of the repair material 51). Thus, the first pins 52a extend through some of the openings 55 of the template 54 while leaving other openings 55 empty. The second pins 52b are then inserted through the empty openings of the template 54 and through the repair material 51. The template 54 thereby provides the benefit of locating the second pins 52b within the perforation 30 pattern over an area of the perforated skin 22 that has been entirely removed.

Figure 6:
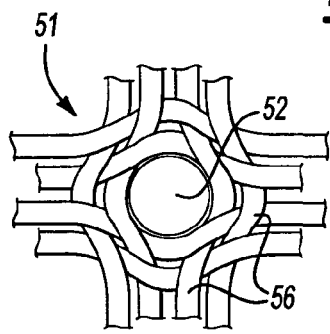
FIG. 6 illustrates an example of displaced continuous fibers of a repair material during the repair process.

FIG. 6 shows fibers 56 of the repair material 51. In this example, the pin 52 (i.e., pin 52a or 52b) displaces the fibers 56 within the repair material 51 as the pin 52 is inserted through a repair material 51. In one example, a tapered end 57 of the pin 52 (FIG. 5) wedges through the repair material and moves the fibers 56 aside such that the fibers 56 curve around the pin 52, while remaining intact and continuous. This provides a benefit of maintaining the structural integrity and reinforcing properties of the fibers 56.

Referring again to FIG. 5, a cushion 58 is then placed over the repair section 51 such that the ends of the pins 52a and 52b extend into the cushion 58. In the illustrated example, the cushion 58 is made of an elastic material, such as rubber, to absorb the ends 57 of the pins 52a and 52b, to protect the pins 52a and 52b, and to prevent the pins 52a and 52b from contacting other articles. Optionally, a breather ply 59 may be added between the cushion 58 and the repair material 51 to provide a means to apply vacuum and to provide a mechanism to remove excess resin during compaction to the repair material 51.

In the illustrated example, the area of the repair material 51 is sealed within a vacuum bag 60 in a known manner. The vacuum bag 60 is evacuated to a desired level, and the resulting vacuum within the vacuum bag 60 produces a net atmospheric pressure on the cushion 58 that compresses the repair material 51. This squeezes some resin from the repair material 51 and consolidates it. At least the area of the repair material 51 is then heated to cure the repair material 51. Alternatively, the repair material 51 may utilize a resin that does not require heating. The repair material 51 may be any of a variety of different types of material. In one example, the repair material 51 is a composite of an uncured or partially cured resin matrix with continuous woven fiber reinforcement (i.e., a prepreg). In another example, the repair material 51 includes a dry ply or plies of continuous woven fibers and a liquid resin that is cured after placing the dry ply or plies onto the pins 52a and 52b.

After the curing step 48, the vacuum bag 60, cushion 58, and template 54 are removed from the perforated composite 20. The pins 52a and 52b are also removed, leaving behind perforations 30' that extend through the repair material 51 and through a portion of the original perforated skin 22. Thus, the pins 52a and 52b function as a type of place holder during the curing of the repair material 51 to form the perforations 30'.

Alternatively, instead of using the vacuum bag 60, the perforated composite 20 is mechanically pressed or clamped to exert the pressure on the cushion 58 during curing of the repair material 51, or no pressure is used to consolidate the repair material 51. Optionally, the pins 52a and 52b have a taper from one end of the pins 52a and 52b to the other end to facilitate removal of the pins 52a and 52b from the perforated composite 20 after curing. In one example, the taper is about 30. The pins 52a and 52b can also be lubricated to further facilitate removal from the repair material 51.

In another example, an adhesive 62 (FIG. 5) is used in addition to the repair material 51. In this example, the adhesive 62 is placed between the remaining perforated skin 22, such as on the tapered surface 50, and the repair material 51. The adhesive 62 promotes bonding between the remaining perforated skin 22 and the repair material 51. In one example, the adhesive 62 is a polymeric material that is compatible with the base resin materials used for the repair material 51 and the perforated skin 22. A compatible adhesive 62 may be any material that provides a desired degree of bonding between the repair material 51 and the remaining perforated skin 22.

Figure 7:
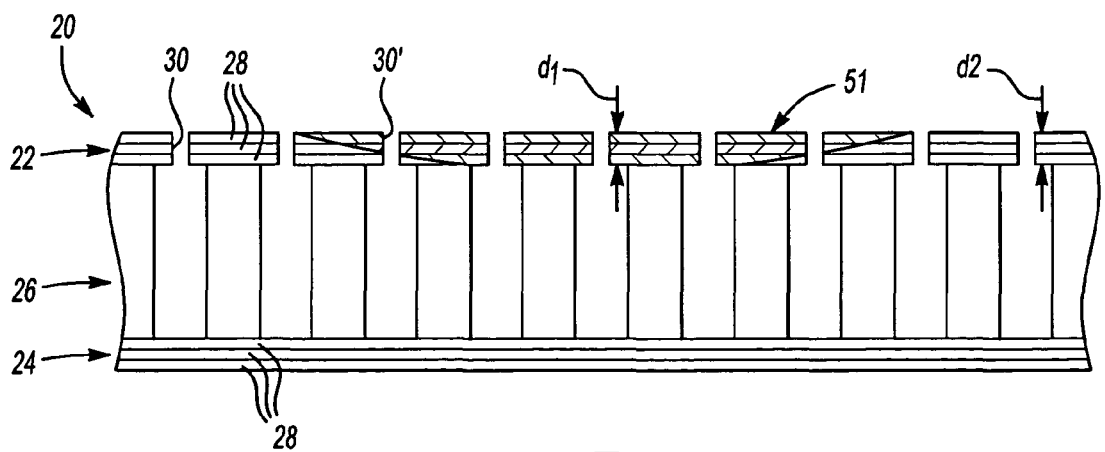
FIG. 7 illustrates the perforated composite after the repair process.

FIG. 7 illustrates the perforated composite 20 after the repair process. In this example, the repair material 51 has a thickness dimension $D_1$ that is approximately equal to a thickness dimension $D_2$ of the original perforated skin 22. Furthermore, since the repair material 51 was formed without cutting the fibers 56 (i.e., the fibers 56 were displaced by pins 52), the repair material 51 has structural properties similar to the original perforated skin 22. Additionally, since the perforations 30' of the repair material 51 are matched with the pattern of the preexisting perforations 30 of the perforated skin 22, the acoustics of the perforated composite 20 after the repair are similar to the original perforated composite 20. Thus, the disclosed examples provide a method of repairing the perforated composite 20 such that the structural, acoustic, and dimensional properties are maintained.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A perforated composite component having a section restored including a non-perforated skin and a honeycomb between the non-perforated skin and a repair material prepared by a process comprising the steps of:
   (a) removing an undesirable section of a perforated skin;
   (b) depositing a repair material in the location of the removed undesirable section;
   (c) curing the repair material; and
   (d) forming at least one opening through the repair material prior to completing step (c) to produce at least one perforation through the repair material upon completing step (c).

2. A perforated composite component comprising:
   a honeycomb;
   a perforated skin bonded to the honeycomb; and
   a repair section bonded to the perforated skin, wherein the repair section comprises at least one perforation that extends there through and at least one continuous reinforcement fiber that has been displaced within the repair section to accommodate the at least one perforation.

3. The component as recited in claim 2, wherein the perforated skin has a first thickness and the repair section has a second thickness that is about equal to the first thickness.

4. The component as recited in claim 2, further comprising an adhesive material between the perforated skin and the repair section.

5. The component as recited in claim 2, wherein the at least one perforation includes a first perforation that extends through each of the repair section and the perforated skin.

6. The component as recited in claim 2, wherein the perforated skin and the repair section each include composite layers, wherein the composite layers of the repair section overlap at least a portion of the composite layers of the perforated composite.

7. The component as recited in claim 2, wherein the at least one continuous reinforcement fiber is displaced adjacent the at least one perforation without severing the at least one continuous reinforcement fiber.

8. The component as recited in claim 2, wherein the at least one continuous reinforcement fiber displaced to form the at least one perforation is located within a repair material.

9. The component as recited in claim 2, wherein the at least one continuous reinforcement fiber curves around the at least one perforation.

10. The component as recited in claim 2, wherein the at least one continuous reinforcement fiber crosses a second continuous reinforcement fiber in a transverse direction.

11. The component as recited in claim 2, wherein the at least one continuous reinforcement fiber and the second continuous reinforcement fiber curve around the at least one perforation.

12. The component as recited in claim 2, wherein the at least one continuous reinforcement fiber is displaced within the repair material without severing the at least one continuous reinforcement fiber.

13. The component as recited in claim 2, wherein the at least one perforation is formed in the location of the repair section bonded to the perforated skin.

14. The component as cited in claim 2, wherein the at least one perforation is located only on a first side of the perforated composite.

* * * * *